United States Patent
Kawamoto et al.

(10) Patent No.: US 12,405,139 B1
(45) Date of Patent: Sep. 2, 2025

(54) FLOWMETER

(71) Applicant: TOFLO CORPORATION, Tokyo (JP)

(72) Inventors: Takahiro Kawamoto, Tokyo (JP); Takuo Shimada, Tokyo (JP); Shinji Tobimatsu, Tokyo (JP); Maya Nakamura, Tokyo (JP); Yuka Fujie, Tokyo (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

(21) Appl. No.: 19/057,723

(22) Filed: Feb. 19, 2025

(30) Foreign Application Priority Data

May 30, 2024 (JP) .................................. 2024-087672
Sep. 6, 2024 (JP) .................................. 2024-154293

(51) Int. Cl.
*G01F 1/115* (2006.01)
*G01F 1/075* (2006.01)

(52) U.S. Cl.
CPC .......... *G01F 1/1155* (2013.01); *G01F 1/0755* (2013.01)

(58) Field of Classification Search
CPC .......... G01F 1/06; G01F 1/075; G01F 1/0755; G01F 1/10; G01F 1/115; G01F 1/1155
See application file for complete search history.

(56) References Cited

FOREIGN PATENT DOCUMENTS

| CN | 2708257 Y | 7/2005 |
|---|---|---|
| CN | 204944552 U | 1/2016 |
| CN | 109752055 A | 5/2019 |
| CN | 110006497 A | 7/2019 |
| CN | 111094904 A | 5/2020 |
| CN | 115629343 A | 1/2023 |
| CN | 220772270 U | 4/2024 |
| JP | S53-036372 U | 3/1978 |
| JP | S63-222216 A | 9/1988 |
| JP | S64-002183 U | 1/1989 |
| JP | H06-123644 A | 5/1994 |
| JP | H08-135466 A | 5/1996 |
| JP | H08-135467 A | 5/1996 |
| JP | H09-243767 A | 9/1997 |
| JP | 2004-294020 A | 10/2004 |
| JP | 2007071571 A | 3/2007 |
| JP | 2011-117757 A | 6/2011 |
| JP | 6257833 B1 | 1/2018 |
| KR | 10-2442957 B1 | 9/2022 |

OTHER PUBLICATIONS

Masaki et al., Hot-Water Supply Device, Oct. 2004, FIT Machine Translation (Year: 2004).*

* cited by examiner

*Primary Examiner* — Erika J. Villaluna
(74) *Attorney, Agent, or Firm* — Bridgeway IP Law Group, PLLC; Sang Ho Lee; Hyun Woo Shin

(57) ABSTRACT

A flowmeter suitable for flow measurement of extremely-low temperature fluids and high temperature fluids includes a flow path pipe having a flow path for fluid to flow through; an impeller supported in the interior of the flow path pipe in a rotatable manner; and a sensor that measures the flow of the fluid flowing in the flow path through the rotation of the impeller. The sensor has a metal-based wiring substrate inside a sensor housing provided outside the flow path pipe. The wiring substrate is equipped with a magnetic sensor package that detects the magnetic force of the impeller; a heater that heats the wiring substrate; and a temperature control circuit that controls the heater to power on/off based on the temperature of the wiring substrate.

6 Claims, 5 Drawing Sheets

FLOWMETER

CROSS-REFERENCE TO RELATED APPLICATIONS

This application claims the priority of Japanese Patent Applications No. 2024-087672 filed on May 30, 2024, and No. 2024-154293 filed on Sep. 6, 2024, in the Japanese Patent Office, the disclosures of which are incorporated herein by reference.

TECHNICAL FIELD

The present disclosure relates to the flowmeter suitable for flow measurement of fluids with a temperature in a wide temperature range from extremely-low temperature to high temperature.

BACKGROUND

In recent years, flow measurement of extremely-low temperature fluids has been sought in semiconductor manufacturing processes. When the flow of fluids (such as fluorine refrigerants) at extremely-low temperature (such as −120° C.) is measured, impeller-type flowmeters are commonly used. Due to the use of semiconductor sensors such as Hall ICs as magnetic sensors in impeller-type flowmeters, the temperature characteristics at low temperatures are poor. If the fluid temperature is below −40° C., detection cannot be performed. Therefore, the following flowmeter is known: by using a detection method that uses a pickup coil as a magnetic sensor, it is possible to measure the flow of extremely-low temperature fluids.

However, due to the copper winding of the pickup coil, it is susceptible to noise from external magnetic fields in all directions as an antenna. In addition, in recent years, semiconductor manufacturing factories have sought to reduce the setting area of devices, shorten the distance between various components inside the devices, and make the flowmeters be in an environment that is prone to misoperation due to these magnetic field noises by having motors, solenoid valves, electromagnetic switches, inverters, power lines, etc. near them. Therefore, the flowmeter need to be configured as far away as possible within the device, becomes difficult to use.

On the other hand, if semiconductor sensors such as Hall ICs are used as in the past, detection has directionality and is not easily affected by the external magnetic field noise. However, especially when low temperature fluids are used, the detection sensitivity of Hall elements decreases, which poses a problem of inability to detect. Therefore, in order to prevent a decrease in the detection sensitivity of Hall elements, it is known that there is a hot water supply device equipped with a water quantity sensor which includes a Hall element and a heater.

However, the hot water supply device is controlled based on the ambient temperature outside the water quantity sensor, rather than measure the temperature near the Hall element, so the temperature control of the Hall element cannot be accurately performed. In addition, in the case of extremely-low temperature fluids, thermal insulation materials need to be used to cover almost the entire outer packaging surface in order to prevent condensation and freezing on the outside of the product. Because the ambient temperature and sensor temperature will deviate due to their thermal insulation properties, the problem of being difficult to control the temperature correctly exists. In addition, it is necessary to imagine the situation where the semiconductor fabrication apparatus momentarily stops or abnormally stops. In order to maintain a temperature that can operate even if heat is carried away by low temperature fluids for a period of time while the power is disconnected, heat storage is required. However, there is no such solution.

SUMMARY

Technical Problem

The present disclosure is made to solve the above-mentioned problems, and its purpose is to provide a flowmeter suitable for flow measurement of extremely-low temperature fluids and high temperature fluids.

Technical Solution

In order to solve the problem, the flowmeter of the present disclosure is characterized in that it includes: a flow path pipe having a flow path for fluid to flow through; an impeller supported in the interior of the flow path pipe in a rotatable manner; and a sensor that measures the flow of the fluid flowing in the flow path through the rotation of the impeller. The sensor is provided with a metal-based wiring substrate inside a sensor housing provided outside the flow path pipe. The wiring substrate is equipped with a magnetic sensor package that detects the magnetic force of the impeller; a heater that heats the wiring substrate; and a temperature control circuit that controls the heater to power on/off based on the temperature of the wiring substrate. The magnetic sensor package is mounted on the wiring substrate by welding.

In addition, the following structure may also be adopted in the flowmeter of the present disclosure: the magnetic sensor package is a magnetic sensor package with a thermal pad that a magnetic sensor element is provided on the thermal pad.

In addition, the following structure may also be adopted in the flowmeter of the present disclosure: the wiring substrate is designed such that the width of the part of the substrate mounted with the magnetic sensor package is less than the width of an other part of the substrate.

In addition, the following structure may also be adopted in the flowmeter of the present disclosure: the flow path pipe is composed of an inflow pipe with an inflow port and an outflow pipe with an outflow port, a compartment is accommodated in the space between the inflow pipe and the outflow pipe, and the impeller with a diameter larger than the inner diameter of the flow path is built into the compartment.

In addition, the following structure may also be adopted in the flowmeter of the present disclosure: a wave washer is inserted between the compartment and the inflow pipe, and a metal seal is inserted at the joint surface between the inflow pipe and the outflow pipe.

Technical Effect

In accordance with the flowmeter of the present disclosure, by using a semiconductor sensor with a magnetic sensor package (Hall IC, etc.), it is not easily affected by the influence of external magnetic field noise, and by equipped with the magnetic sensor package, the heater, and temperature control circuit on the metal based wiring substrate for temperature control, it is able to perform temperature control of the sensor accurately. Therefore, a uniform temperature across the substrate is maintained with the metal-based wiring substrate and a heat storage effect of maintaining the temperature at which the sensor can operate during momentary stops or abnormal stops is obtained. In particular, a semiconductor sensor with a magnetic sensor package (such as Hall IC) has a guaranteed operating temperature, and although detection cannot be performed if the fluid temperature drops below −40° C., by heating the metal based wiring substrate with the heater and maintaining a temperature above −40° C., it is provided with the effect of being able to achieve flow measurement suitable for extremely-low temperature fluids. In addition, since the metal-based wiring substrate is able to absorb heat near the sensor efficiently and dissipate this heat to the outside, it is provided with the effect of being able to perform flow measurement that is also suitable for high temperature fluids.

DETAILED DESCRIPTION

Hereafter, embodiments of the present disclosure will be described with reference to accompanying drawings.

Figure 1:
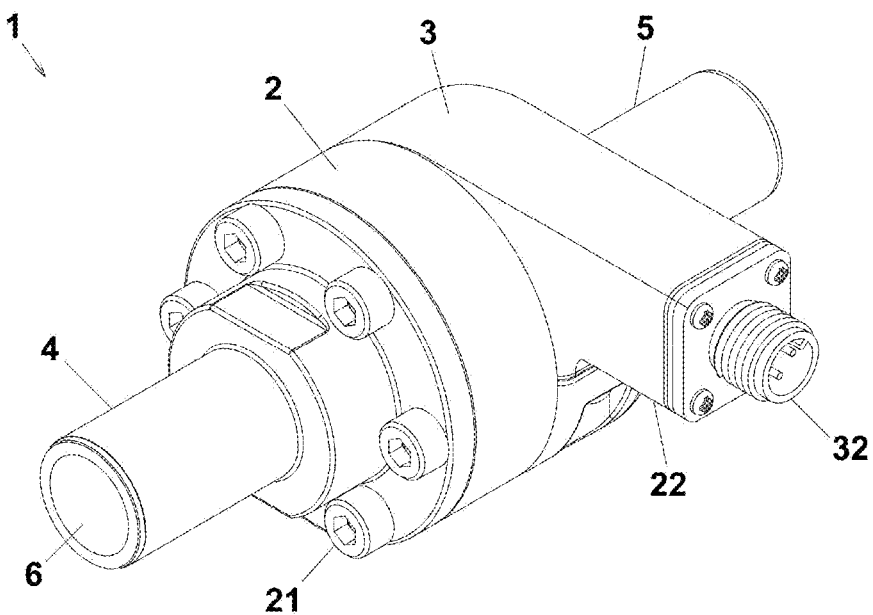
FIG. 1 is a perspective view showing the appearance of the flowmeter of the present disclosure.
Figure 2:
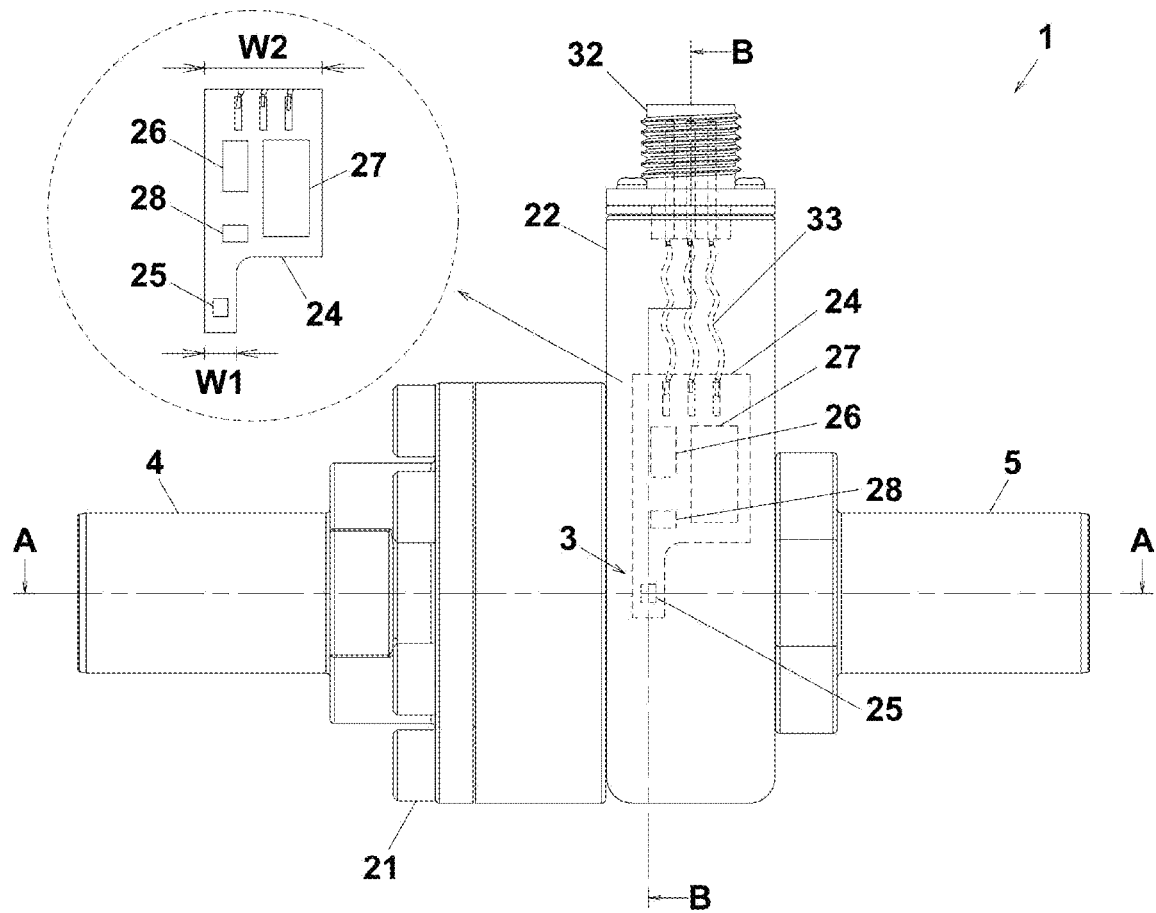
FIG. 2 is a top view showing the appearance of the flowmeter.

As shown in FIG. 1 and FIG. 2, a flowmeter 1 of the present embodiment is an impeller-type flowmeter that measures the flow of a fluid by detecting an impeller that rotates proportionally to the flow rate, and it is a sensor-integrated flowmeter provided with a sensor 3 outside a flow path pipe 2 having a flow path for fluid to flow through, wherein the sensor measures the flow of the fluid based on the rotational speed of the impeller. As the purpose of this flowmeter 1, for example, it can be used for flow measurement of fluorine-containing inert liquids by connected to a horizontal tubing of a temperature control cooler for a semiconductor fabrication apparatus. Flow measurement can be performed at a fluid temperature within a wide temperature range from extremely-low temperature of −120° C. to high temperatures of +150° C.

Figure 3:
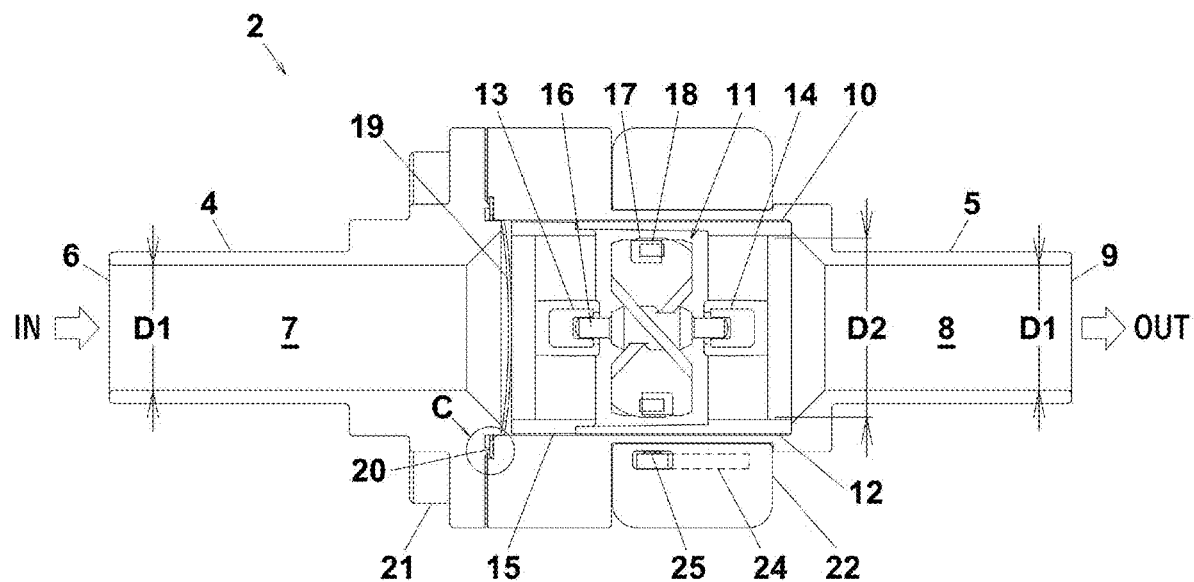
FIG. 3 is a cross-sectional view of the flowmeter taken along line A-A in FIG. 2.

FIG. 3 is a cross-sectional view showing the internal structure of the flow path pipe 2. As shown in this figure, in order to avoid being magnetized by heat during welding and/or processing, the flow path pipe 2 is composed of two metal components made of stainless steel (such as SUS316), an inflow pipe 4 and an outflow pipe 5. An upstream flow path 7 is formed in the inflow pipe 4, wherein the upstream flow path is communicated from the inflow port 6 at the opening in one end, and a downstream flow path 8 is formed in the outflow pipe 5, wherein the downstream flow path is communicated with the outflow port 9 at the opening in the other end. An impeller 11 built into a compartment 10 is provided in the space between the upstream flow path 7 and the downstream flow path 8. In the impeller-type flowmeter, in order to reduce pressure loss, it is preferable to make the impeller diameter larger than the flow path diameter. Therefore, in this embodiment, a structure is adopted in which a recess 12 with a diameter larger than the inner diameter D1 of the flow paths (the upstream flow path 7 and the downstream flow path 8) is provided on the inner side of the outflow pipe 5, and the compartment 10 with the impeller 11 built in is accommodated in the recess 12.

The compartment 10 is composed of thermoplastic resin (such as PPS) with excellent heat resistance. Ceramic (such as alumina) bearings 13 and 14 are arranged opposite to each other in the center of compartment 10, and a rectifier board (such as PPS) 15 is radially integrally formed around bearing 13 on the side near the inflow pipe 4. The impeller 11 is provided with four blades 17 (17A, 17B, 17C, 17d) made of thermoplastic resin (such as PPS) in a radial and spiral manner on the outer periphery of a ceramic (such as alumina) rotary shaft 16. A magnet 18 made of samarium cobalt or other materials with excellent heat resistance and corrosion resistance is embedded in two blades 17 (17B and 17D) that are 180 degrees opposite to each other among the four blades 17 (17A, 17B, 17C, 17D). The impeller 11 is designed with an outer diameter D2 larger than the inner diameter D1 of the flow paths (the upstream flow path 7 and the downstream flow path 8), and is supported in a manner that allows it to rotate around the axial center of rotary shaft 16 supported by bearings 13 and 14.

In the flow path pipe 2, the fluid flowing into the compartment 10 from the inflow port 6 through the upstream flow path 7 becomes a vortex through the rectifier board 15 and the spiral blades 17, and flows out from the outflow port 9 through the downstream flow path 8. In this embodiment, due to the adoption of an axial-flow type that causes the fluid to vertically collide with the rotating surface of the impeller 11, there is no restriction on the installation posture (vertical or horizontal) of the flowmeter 1 towards the tubing; and due to small axial stress, there is no problem, thereby fewer faults and a long lifespan can be achieved. In addition, since only the compartment 10, which is obtained by unitizing the impeller 11, the bearings 13, 14, and the rectifier board 15 in advance, is accommodated in the recess 12, the assembly operation of the components can be simplified and maintenance operations can be easily carried out.

Since a compartment accommodation structure that is not easily offset between the centers of the bearings 13, 14 supporting the impeller 11, and is designed to reduce pressure loss and is unitized is adopted in the flowmeter 1 of this embodiment, a sealing part is required at the joint surface between the inflow pipe 4 and the outflow pipe 5. Usually, rubber gaskets such as O-rings are used in the sealing part, however the rubber gaskets become hard and unable to seal below −50° C., and a metal seal body is used in this embodiment. That is, a wave washer 19 made of metal (such as SUS304) is inserted between the compartment 10 and the inflow pipe 4 to prevent the shaking of the compartment 10, and a metal seal 20 made of metal (such as SUS304) is inserted into a part of the joint surface between the inflow pipe 4 and the outflow pipe 5. Moreover, by fastening a plurality of bolts with hexagonal hole 21, to the inflow pipe 4 from the outside of the inflow pipe 4, the joint surface between the inflow pipe 4 and the outflow pipe 5 is sealed.

Figure 4:
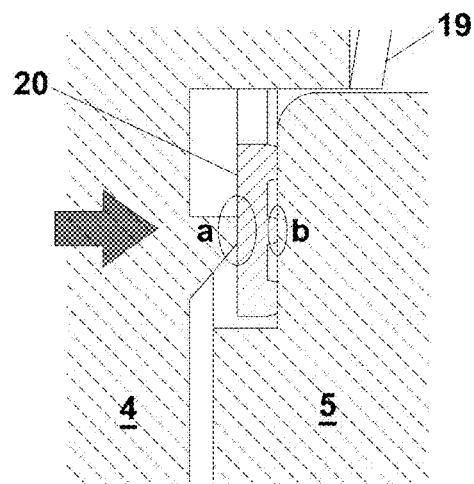
FIG. 4 is an enlarged cross-sectional view of the flowmeter showing section C in FIG. 3.

In the case of a conventional metal seal body, due to the lower yield rate during manufacturing compared to rubber gaskets, in this embodiment, the yield rate is significantly improved by setting the gasket shape that limits the contact area. That is, if a bolt with hexagonal hole is used for fastening, as shown in FIG. 4, the product is pressed in the direction of the arrow and the gasket is crushed, however usually the gasket is mostly pressed against by its entire surface, and the load per unit area is dispersed, resulting in the problem of poor sealing property due to the lack of force concentration in a certain part. Therefore, for the metal seal 20 of this embodiment, the gasket shape of which the contact area is limited by reducing the contact surface a with the inflow pipe 4 and reducing the contact surface b with the outflow pipe 5 is set, and the force is only applied to the part marked with a circular mark in the figure, which can maintain high sealing property with relative weak fastening force.

In addition, the conventional metal seal body is fastened by rotating the entire body, so there is a problem of the gasket sliding in the direction of rotation during rotation, and the surface corroding due to the frictional heat and/or biting generated on the surface at this time, which damages the sealing property. Therefore, in this embodiment, the fastening structure of bolt with hexagonal hole 21 is adopted, and the force is applied only in the vertical direction, without generating frictional heat and/or biting on the surface, and without causing surface corrosion. Therefore, it is possible to achieve high sealing property and also economically perform metal sealing without the need for components to solve the problem.

It should be noted that conventional pipe threads such as Rc threads are sealed with sealing tape, rubber or resin sealant for threads. However, when these sealing components are connected to metal joints such as stainless steel, there is a problem of easy to cause liquid leakage because their thermal shrinkage is greater than that of metal at low temperatures. Therefore, in this embodiment, instead of pipe threads pipe extension structures are adopted in the appearances of the inflow pipe 4 and outflow pipe 5. Therefore, it is possible to install a double-ferrule Swagelok pipe joint (manufactured by Swagelok Company, trade name) on the flow path pipe 2, and a VCR joint (manufactured by Swagelok Company, trade name) at the front end of the welded pipe. As a result, the flow path pipe 2 and the joint are made of the same material, and the thermal expansion rates are the same even at low temperatures. Therefore, there is no need to worry about gap or liquid leakage even when using low temperature fluids, and high hermeticity can be maintained.

Figure 5:
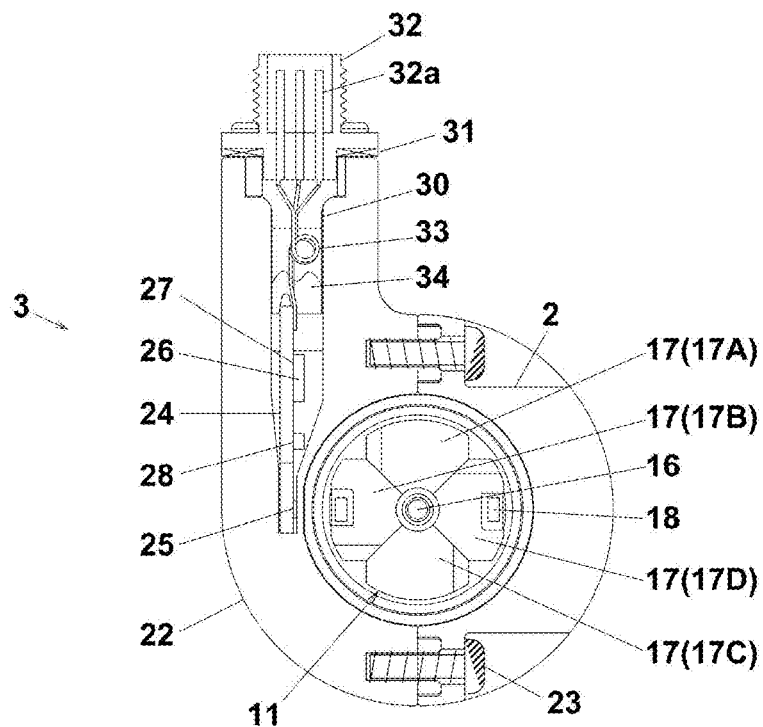
FIG. 5 is a cross-sectional view of the flowmeter taken along line B-B in FIG. 2.

FIG. 5 is a cross-sectional view showing the internal structure of the sensor 3. As shown in this figure, the sensor 3 is accommodated in a sensor housing 22 made of thermoplastic resin (such as PPS) with excellent heat resistance. The sensor housing 22 is fastened and fixed to the flow path pipe 2 with a self-tapping screw 23, and is provided outside the flow path pipe 2. A metal-based wiring substrate 24 with high thermal conductivity is built into the interior of sensor housing 22.

Figure 6:
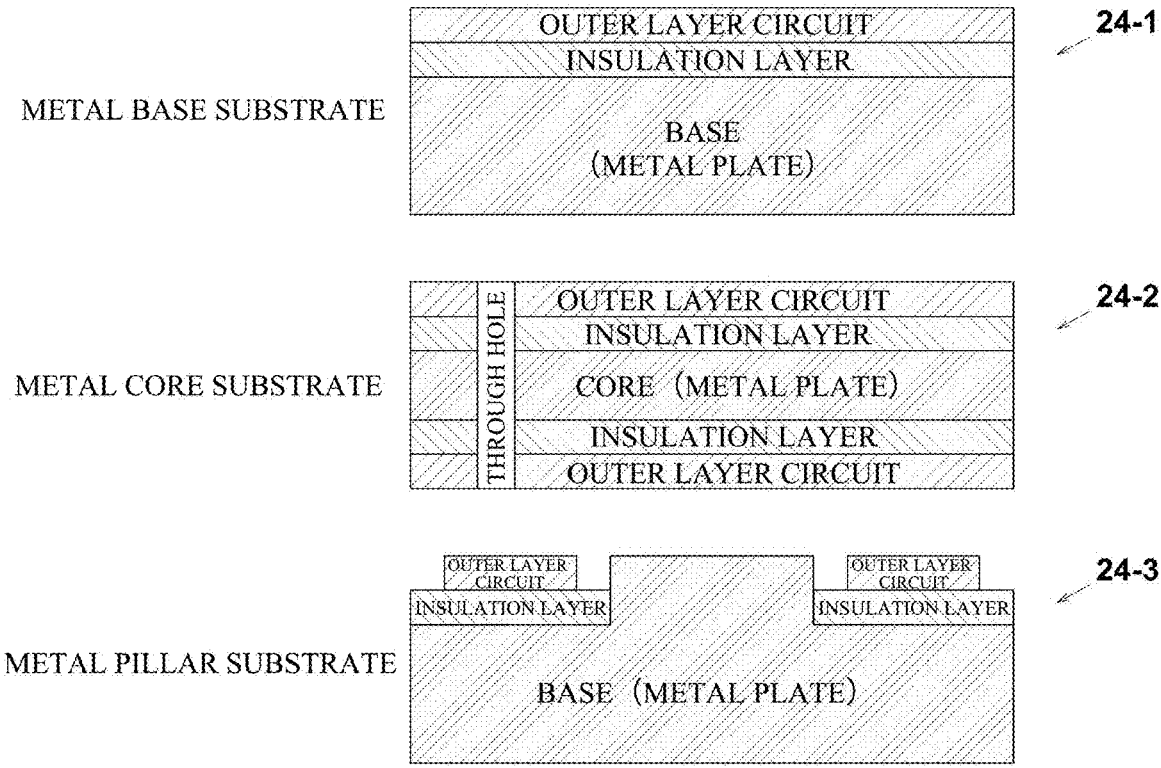
FIG. 6 is a schematic diagram showing an example of a metal-based wiring substrate in the flowmeter.

The metal-based wiring substrate 24 refers to anyone of the metal base substrate 24-1, metal core substrate 24-2, and metal pillar substrate 24-3 shown in FIG. 6. The metal substrate 24-1 is formed by stacking an insulation layer on the surface of a metal plate (aluminum plate, copper plate) that serves as the base (substrate), and forming an outer layer circuit on it. The metal core substrate 24-2 is formed by stacking insulation layers on the surface and back of the metal plate (aluminum plate, copper plate) that serves as the core (substrate), forming outer layer circuits thereon, and setting a through hole. The metal pillar substrate 24-3 is formed by stacking an insulation layer on the surface of a metal plate (aluminum plate, copper plate) that serves as the base (substrate), forming an outer layer circuit on it, and exposing the metal plate.

A non-contact magnetic style sensor package 25 for detecting the magnetic force of the impeller 11 is installed on the metal-based wiring substrate 24 at a position opposite to the impeller 11 inside the flow path pipe 2. The magnetic sensor package 25 of this embodiment is a Hall IC with a built-in Hall element, which serves as a magnetic sensor element and converts the magnetic force into voltage utilizing the Hall effect. The magnetic sensor package (Hall IC) 25 is an electronic component package composed of a chip-based circuit, and has the function of detecting rotational speed with magnetic force. The chip-based circuit is composed of a Hall element, a power circuit, an operational amplifier, a Schmitt trigger, and a transistor. If the fluid passes through the interior of the flow path pipe 2, the magnet 18 also rotates along with the rotation of the impeller 11, and the magnet 18 outputs magnetic force to the outside of the flow path pipe 2 every time passing through. If the magnetic sensor element (Hall element) of the magnetic sensor package (Hall IC) 25 detects the magnetic force, a potential difference is generated, which is amplified by the operational amplifier. If the Schmitt trigger is detected to be above the upper limit or below the lower limit, the transistor outputs a digital signal of on/off (Lo/Hi).

Above the metal-based wiring substrate 24, there is also provided a heater 26 that heats the wiring substrate 24; a temperature control circuit 27 controls the heater 26 to power on/off; and a temperature sensor 28 that detects the temperature of the wiring substrate 24. The heater 26 is composed of resistors. If current flows with power-on, heat is generated and the wiring substrate 24 is heated, which prevents the temperature of the magnetic sensor element (Hall element) of the magnetic sensor package (Hall IC) 25 from decreasing. The temperature sensor 28 detects the temperature of the wiring substrate 24 with such as a thermistor. If the temperature control circuit 27 detects that the temperature of the wiring substrate 24 is below the set temperature (lower limit), the heater 26 powers on. If the temperature of the wiring substrate 24 is detected to be above the set temperature (upper limit), the heater 26 powers off and performs temperature control of the wiring substrate 24. It should be noted that although the temperature control circuit 27 and the temperature sensor 28 are provided as different components, a single-chip-based electronic component such as a temperature control circuit with a built-in temperature sensor can also be used.

In this embodiment, the magnetic sensor package (Hall IC) 25 is mounted on the metal-based wiring substrate 24 by welding. For example, as shown in (A) of FIG. 7, the following structure can be adopted: the terminal 25b connected to the magnetic sensor element (Hall element) 25a being mounted on the electrode 24a of the wiring substrate 24 by solder s. In this way, it is possible to achieve long-term stable and high-precision positioning of the magnetic sensor element (Hall element) 25a utilizing fixation of metals to each other. Furthermore, assuming repeated use even at a temperature within a wide temperature range from −120° C. to +150° C., since the metals have similar thermal expansion rates to each other, the falling-off of an electronic component due to thermal cycling can be prevented. In addition, due to the fact that the temperature of the wiring substrate 24 is easily transmitted directly to the magnetic sensor element (Hall element) 25a by solder s and metal with good thermal conductivity such as the terminal 25b, it is provided with effect of achieving high-precision temperature control.

Figure 7:
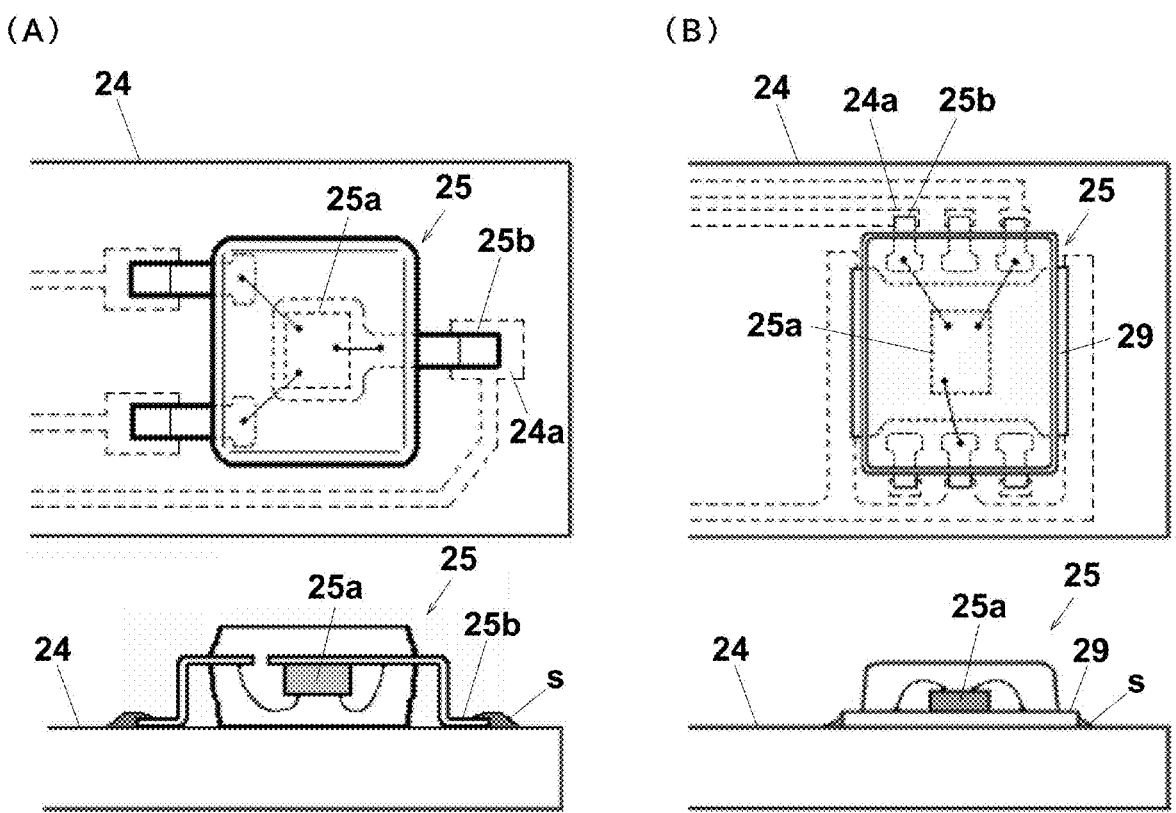
FIG. 7 is an enlarged view showing the vicinity of the Hall IC of the flowmeter.

In addition, as shown in (B) of FIG. 7, as another example of the magnetic sensor package (Hall IC) 25, a magnetic sensor package with a thermal pad may also be used. That is, the following structure can also be adopted: a magnetic sensor package (Hall IC) 25 with a magnetic sensor element (Hall element) 25a mounted on the surface of a thermal pad 29 made of copper plate being used, and the thermal pad 29 on the back being mounted on the electrode 24a of the wiring substrate 24 with solder s. Therefore, there is copper with good thermal conductivity between the wiring substrate 24 and the magnetic sensor element (Hall element) 25a, which can maintain the wiring substrate 24 and the magnetic sensor element (Hall element) 25a at approximately same temperatures, and it is provided with the effect of achieving high-precision temperature control based on extremely-high thermal conductivity.

As shown in FIG. 5, the metal based wiring substrate 24 is inserted into the interior of the sensor housing 22 with a substrate platen 30 made of resin, moisture is prevented from entering from the outside utilizing a rubber gasket 31, and falling-off prevention and waterproof protection are carried out utilizing a waterproof connector 32 for an M12 connector. Although internal cables 33 such as power conductors and/or signal conductors are provided in the interior of sensor housing 22, a filler material (such as heat-resistant epoxy resin) 34 is bonded and fixed in a way to cover the outer periphery of these internal cables 33. Therefore, there will be no convection of air in the internal space of the sensor housing 22, and even if there is a high-temperature fluid flowing in the flow path, heat transfer from the flow path pipe 2 to the wiring substrate 24 can be prevented. On the contrary, even if there is a low-temperature fluid flowing in the flow path, the condensation of the wiring substrate 24 can be suppressed. Even if the flow path pipe 2 condenses or freezes, the internal wires will not rust and poor contact of the internal cable 33 can be prevented. In addition, even if it is assumed that the adhesive peeling between the filler material 34 and the sensor housing 22 occurs due to thermal changes, the wiring substrate 24 can be stably fixed without falling-off with the substrate platen 30.

In this way, in this embodiment, the magnetic sensor package (Hall IC) 25, the heater 26, the temperature control circuit 27, and the temperature sensor 28 are mounted on one metal based wiring substrate 24 and inserted into the sensor housing 22, and independently control the temperature outside the flow path pipe 2. Thus, accurate temperature control can be performed near the magnetic sensor package (Hall IC) 25. Therefore, a heat storage effect is obtained of which with the metal-based wiring substrate 24, a uniform temperature across the substrate is maintained, and in the meanwhile the temperature at which the sensor 3 can operate during momentary stops or abnormal stops is maintained. In particular, the semiconductor sensor of the magnetic sensor package (Hall IC) 25 has a guaranteed operating temperature, and although detection cannot be performed if the fluid temperature drops below −40° C., by heating the metal based wiring substrate 24 with the heater 26 and maintaining a temperature above −40° C., it is provided with the effect of being able to achieve flow measurement suitable for extremely-low temperature fluids.

In addition, the magnetic sensor package (Hall IC) 25 is provided close to the magnet 18 in a way that the magnetic force of the magnet 18 can be relatively strongly detected, and is less susceptible to an external magnetic field by using Hall elements with the lowest sensitivity possible. Therefore, since the sensor 3 is provided near the flow path of the flow path pipe 2, there is a problem of being easily subjected to the heat of the fluid directly. Therefore, as shown in FIG. 2, for the wiring substrate 24 of this embodiment, the substrate width W1 of the part where the magnetic sensor package (Hall IC) 25 closest to the flow path is mounted is designed to be extremely narrow compared to the substrate width W2 of other parts where the heater 26, the temperature control circuit 27, and the temperature sensor 28 are mounted. Thus, it is provided with the advantage of being able to reduce the heat input received by the wiring substrate 24 from the flow path side.

Figure 8:
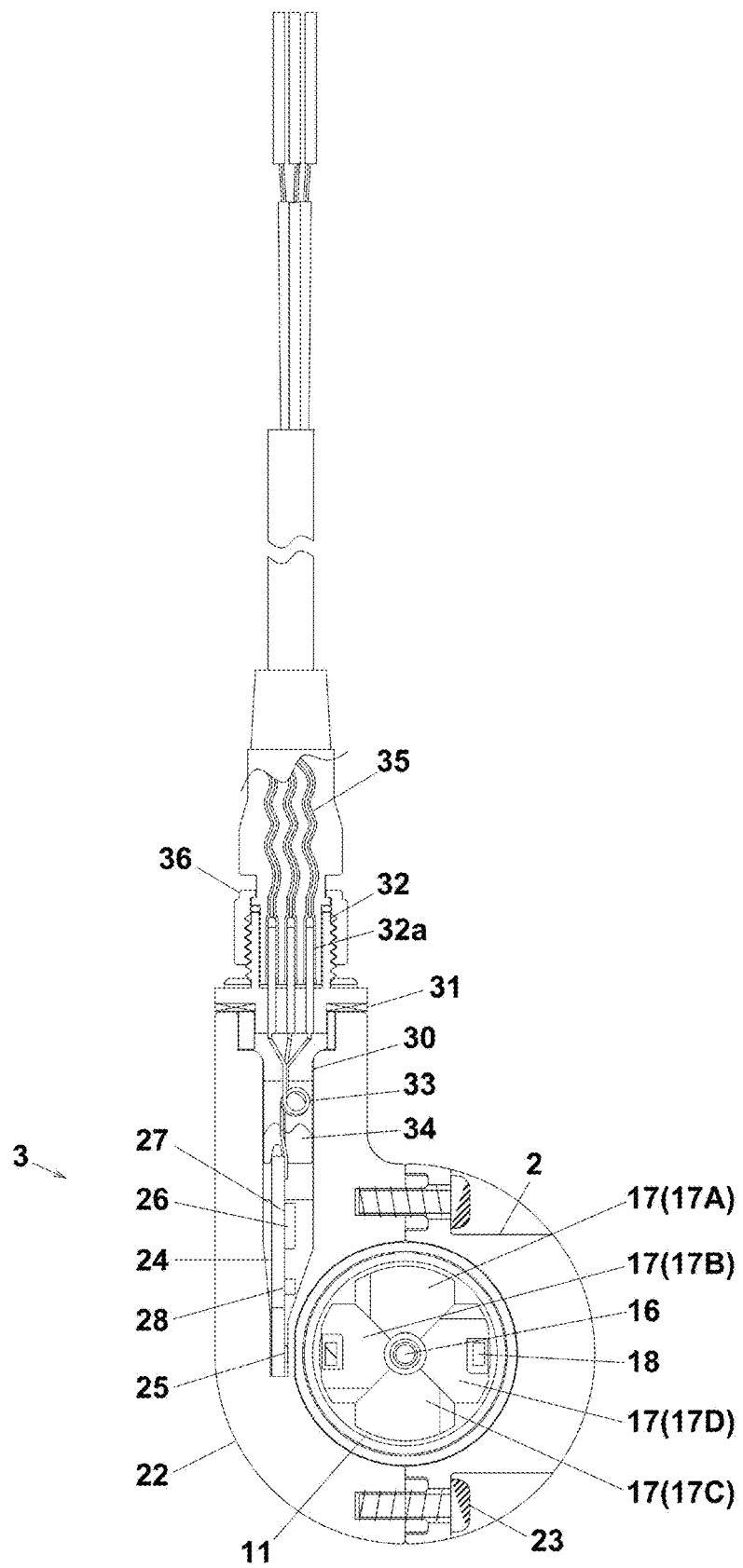
FIG. 8 is a cross-sectional view showing the waterproof connector of the flowmeter in the state when a waterproof connector cable is provided.

In addition, although heating can be achieved with the heater 26 when the fluid is at a low temperature, if heat dissipation can be achieved when the fluid is at a high temperature, it is provided with the advantage of being able to be used for even a relative high temperature fluid. In this embodiment, since the magnetic sensor package (Hall IC) 25 is mounted on the metal-based wiring substrate 24 by welding, the heat received by the magnetic sensor element (Hall element) 25a is efficiently absorbed by the metal based wiring substrate 24 with high thermal conductivity. In addition, as shown in FIG. 8, the heat absorbed by the wiring substrate 24 is efficiently transferred from the internal cables 33 to the external cables 35 through a pin 32a of the waterproof connector 32, and dissipated to the outside air from the waterproof connector cable 36 exposed to the outside air. In this way, since the heat dissipation effect that the magnetic sensor element (Hall element) 25a is enabled to dissipate heat efficiently from the flow path to the outside of the flowmeter can be obtained, flow measurement suitable for high-temperature fluids can also be performed.

It should be noted that in the above embodiments, although a Hall element is used as the magnetic sensor element 25a of the magnetic sensor package 25 for detecting the magnetic force of the impeller 11, the type of the magnetic sensor element 25a is not limited to this. For example, Hall elements that directly output Hall voltage and linear Hall ICs that amplify and linearly output Hall voltage can be used as Hall sensors that utilize the Hall effect. In addition, GMR sensor elements based on Giant Magnetoresistance (GMR) Effect, TMR sensor elements based on Tunneling Magnetoresistance (TMR) and the like can also be used as MR sensors that utilize the Magnetoresistance (MR) Effect. In addition, although PPS is used as the material for the sensor housing 22, foam PPS with excellent thermal insulation properties may also be used.

INDUSTRIAL AVAILABILITY

In the above embodiments, an example of flow measurement of a fluorine-containing inert liquid in a temperature control cooler for a semiconductor fabrication apparatus is given as the use of the flowmeter of the present disclosure. However, it can also be used for flow measurement in hydraulic equipment, etc.

SYMBOL DESCRIPTION

1: Flowmeter
2: Flow path pipe
3: Sensor
4: Inflow pipe
5: Outflow pipe
6: Inflow port
7: Upstream flow path
8: Downstream flow path;
9: Outflow port
10: Compartment 11: Impeller
12: Recess
13: Bearing
14: Bearing
15: Rectifier board
16: Rotary shaft
17: Blade
18: Magnet
19: Wave washer
20: Metal seal
21: Bolt with hexagonal hole
22: Sensor housing
23: Self-tapping screw
24: Wiring substrate
24a: Electrode
25: Magnetic sensor package (Hall IC)
25a: Magnetic sensor element (Hall element)
25b: Terminal
26: Heater
27: Temperature control circuit
28: Temperature sensor
29: Thermal pad
30: Substrate platen
31: Rubber gasket
32: Waterproof connector
32a: Pin
33: Internal cable
34: Filler material
35: External cable
36: Waterproof connector cable

What is claimed is:

1. A flowmeter, comprising:
a flow path pipe having a flow path for fluid to flow through;
an impeller supported in an interior of the flow path pipe in a rotatable manner; and
a sensor that measures the flow of the fluid flowing in the flow path through the rotation of the impeller,
wherein the sensor is provided with a metal-based wiring substrate inside a sensor housing provided outside the flow path pipe,
the wiring substrate is equipped with a magnetic sensor package that detects a magnetic force of the impeller; a heater that heats the wiring substrate; and a temperature control circuit that controls the heater to power on/off based on a temperature of the wiring substrate,
the magnetic sensor package is mounted on the wiring substrate by welding.

2. The flowmeter of claim 1, wherein
the magnetic sensor package is a magnetic sensor package with a thermal pad and a magnetic sensor element is provided on the thermal pad.

3. The flowmeter of claim 2, wherein
the wiring substrate is designed such that a width of a part of the substrate mounted with the magnetic sensor package is less than a width of another part of the substrate.

4. The flowmeter of claim 1, wherein
the wiring substrate is designed such that a width of a part of the substrate mounted with the magnetic sensor package is less than a width of another part of the substrate.

5. The flowmeter of claim 1, wherein
the flow path pipe is composed of an inflow pipe with an inflow port and an outflow pipe with an outflow port, a compartment is accommodated in a space between the inflow pipe and the outflow pipe, and the impeller with a diameter larger than an inner diameter of the flow path is built into the compartment.

6. The flowmeter of claim 5, wherein
a wave washer is inserted between the compartment and the inflow pipe, and a metal seal is inserted at a joint surface between the inflow pipe and the outflow pipe.

* * * * *